United States Patent
Assmann et al.

(10) Patent No.: US 9,695,874 B2
(45) Date of Patent: Jul. 4, 2017

(54) ROLLING-ELEMENT BEARING CAGE

(71) Applicant: AKTIEBOLAGET SKF, Göteborg (SE)

(72) Inventors: Joerg Assmann, Schweinfurt (DE); Thomas Krause, Grafenrheinfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/902,788

(22) PCT Filed: Jul. 3, 2014

(86) PCT No.: PCT/EP2014/064127
§ 371 (c)(1),
(2) Date: Jan. 4, 2016

(87) PCT Pub. No.: WO2015/000998
PCT Pub. Date: Jan. 8, 2015

(65) Prior Publication Data
US 2016/0281780 A1   Sep. 29, 2016

(30) Foreign Application Priority Data
Jul. 3, 2013   (DE) ................ 10 2013 212 986

(51) Int. Cl.
F16C 33/46 (2006.01)
F16C 33/66 (2006.01)

(52) U.S. Cl.
CPC ...... *F16C 33/4635* (2013.01); *F16C 33/4611* (2013.01); *F16C 33/4676* (2013.01); *F16C 33/6629* (2013.01); *F16C 2220/04* (2013.01)

(58) Field of Classification Search
CPC .............. F16C 33/4635; F16C 33/4611; F16C 33/4676; F16C 33/6629
See application file for complete search history.

(56) References Cited

U.S. PATENT DOCUMENTS

| 8,616,776 B2* | 12/2013 | Nakamura | F16C 33/4635 384/470 |
| 8,622,622 B2* | 1/2014 | Solfrank | F16C 33/3806 384/462 |

(Continued)

FOREIGN PATENT DOCUMENTS

| DE | 10065169 A1 | 7/2002 |
| DE | 102011004210 A1 | 8/2012 |

(Continued)

*Primary Examiner* — Thomas R. Hannon
(74) *Attorney, Agent, or Firm* — Bryan Peckjian; SKF USA Inc. Patent Dept.

(57) ABSTRACT

An injection-molded rolling-element bearing cage has a radially outer-lying surface, a radially inner-lying surface, first and second radial walls connecting the radially outer-lying surface and the radially inner-lying surface, and a plurality of receiving pockets configured to receive rolling elements. The receiving pockets are spaced from the first radial wall by a first annular band of the radially inner-lying surface and from the second radial wall by a second annular band of the radially inner-lying surface, and at least one projection extends radially inward from the radially inner-lying surface into a spaced defined by the radially inner-lying surface, at least part of the at least one projection being located in the first annular band.

20 Claims, 3 Drawing Sheets

(56) References Cited

U.S. PATENT DOCUMENTS

2006/0120646 A1  6/2006 Suzuki et al.
2012/0321237 A1  12/2012 Usuki et al.

FOREIGN PATENT DOCUMENTS

| EP | 1862683 A1 | 12/2007 |
| JP | 2001227547 A | 8/2001 |
| JP | 2005180671 A | 7/2005 |
| JP | 2006132724 A | 5/2006 |
| JP | 2008051295 A | 3/2008 |
| JP | 2008151171 A | 7/2008 |
| JP | 2008215390 A | 9/2008 |
| JP | 2009287785 A | 12/2009 |
| JP | 2010071321 A | 4/2010 |
| JP | 2012082916 A | 4/2012 |
| WO | 2013/018793 A1 | 2/2013 |

* cited by examiner

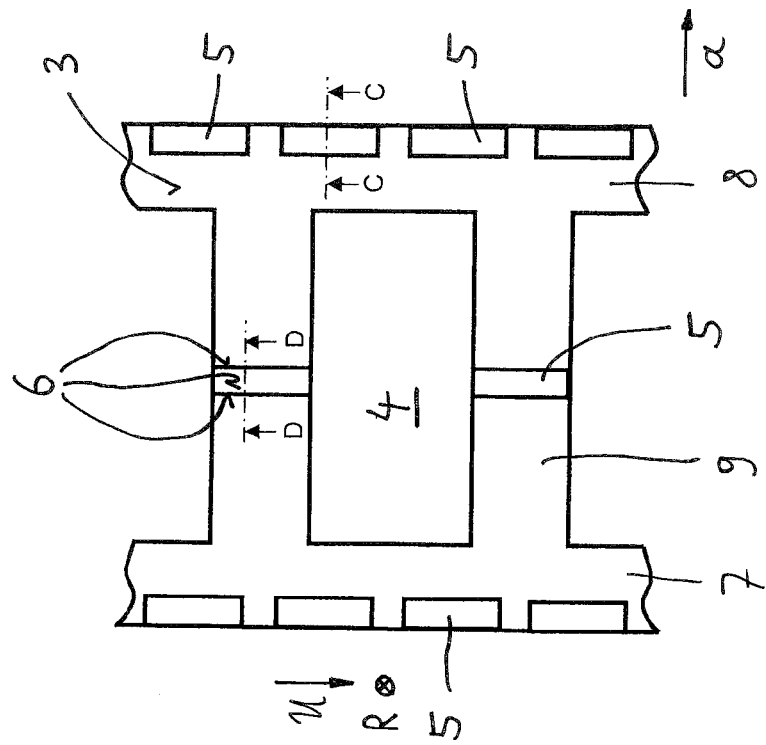
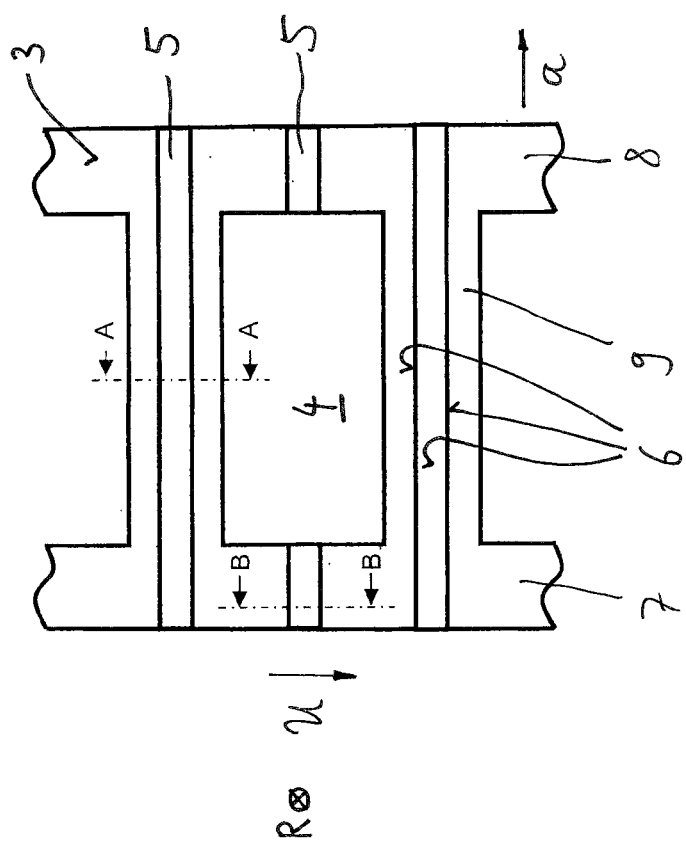

ROLLING-ELEMENT BEARING CAGE

CROSS-REFERENCE

This application is the U.S. National Stage of International Application No. PCT/EP2014/064127 filed on Jul. 3, 2014, which claims priority to German patent application no. 10 2013 212 986.6 filed on Jul. 3, 2013.

TECHNOLOGICAL FIELD

The invention relates to a rolling-element bearing cage comprising an annular element including a radially outer-lying surface and a radially inner-lying surface, wherein receiving pockets for rolling elements are formed in the annular element.

BACKGROUND

Rolling-element bearing cages of the above-mentioned type are well known. They are usually comprised of two side rings, which are connected to each other via a number of bridges. The receiving pockets for the rolling elements are formed between the bridges. For lubricating, lubricating grease is supplied in the space between the bearing-inner- and -outer-ring.

In particular with rapidly rotating rolling-element bearings there is the problem that the grease distribution inside the rolling-element bearing is subject to locally strong fluctuations before, during, and after the running-in process. At high rotational speeds, insufficient lubrication can occur in the rolling-element bearing, above all in the sliding contact and thus in the region of the cage pocket geometry. Due to the high centrifugal forces the grease is pumped at correspondingly high rotational speeds towards the outer-ring raceway, furthermore also out of the bearing-inner-ring geometry. It is thus no longer available in the region of the cage pockets (in the region of the bridges and of the side rings).

To date this problem has been countered by an increased amount of lubricant being supplied or by the bearing being relubricated at relatively short intervals. Both measures result in an environmental impact or higher costs.

SUMMARY

The object of the invention is to further develop a rolling-element bearing cage of the above-mentioned type such that in operation an improved lubricating can be achieved. Here increased amounts of lubricant, just like frequent relubrications of the bearing, can be dispensed with.

The achievement of this object by the invention is characterized in that at least one projection extending radially inward is disposed on the radially inner-lying surface of the cage, which projection extends into the space that is delimited by the inner-lying surface, and which projection forms a free surface in this space.

The projection can be configured as a rib-shaped structure that extends at least sectionally in the axial direction. It can also be configured as a rib-shaped structure that extends at least sectionally in the circumferential direction. A further possibility provides that the projection, seen in the radial direction, forms a self-contained structure; here above all a closed structure in the form of a polygon is intended, wherein in particular a honeycomb shape has proven itself.

Combinations of the designs mentioned are also possible.

The extension can have a rectangular shape in an axial section or in a radial section. Alternatively it can have a conical shape, wherein the projection preferably tapers with increasing distance from the inner-lying surface. According to a further design, in an axial section or in a radial section the projection can have a shape that widens in its end region lying distant from the inner-lying surface, wherein the projection here has in particular a T-shape or an L-shape.

The annular element forming the rolling-element bearing cage, together with the projection or projections, can be formed one-piece, wherein the rolling-element bearing cage is manufactured in particular by an injection-molding process.

Another solution provides that the annular element is comprised of a first material, and the projection or the projections is comprised or are comprised of a second material. The projection or the projections here can in particular be injected-onto the annular element by an injection-molding process.

Furthermore, as a specific design of the invention it can be provided that the at least one projection is configured as a separate component, which is connected to the radially inner-lying surface by a mechanical connection. Here a snap-connection comes into consideration as a preferred connection possibility.

Accordingly the invention is directed to projections (rib structures) in different embodiments and arrangements, which additionally are attached to the inner surface of the rolling-element bearing cage in the bridge- and/or flange-region.

The projections (ribs) provide additional anchoring surfaces and barriers for the bearing grease and thus, in particular with high centrifugal forces, reduce the migratory movement of the grease towards the cage exterior or outer-ring raceway. The risk of insufficient lubrication in the region of the bearing inner geometry is thereby reduced. The grease distribution is thus optimized.

The proposed cages have particularly been proven in railway rolling-element bearings.

They are particularly preferably used in tapered roller bearings and in cylindrical roller bearings, wherein here, above all, high-speed applications come into consideration.

In one of the possible embodiments, only ribs in the axial direction are attached to the cage interior. In terms of manufacturing technology this has the advantage that the cage can easily be demolded as an injection-molded part from the injection mold without additional slider tools. In this variant the individual ribs can also advantageously be reinforced by additional transverse ribs in order to further increase the anchoring surface and barrier effect for the grease.

In another embodiment variant the ribs can be attached to the cage interior such that they extend in the circumferential direction. With this configuration, the use of additional sliders in the core of the injection-molding tool is necessary.

In a further embodiment variant the ribs can extend in both the axial and circumferential direction. Here the geometric arrangement with respect to one another of the ribs extending in the axial and circumferential direction need not necessarily be at a right angle. Rib structures are also possible in a rhombic pattern having rib interior angles of less than 90° or curved rib structures in the shape of hollow cylinders. Honeycomb patterns have also proven themselves.

The projection height (rib height) in the radial direction can be varied within certain limits and is only limited by a minimum necessary distance to the inner-ring flange.

The wall thickness of the projections (rib-wall thickness) can be varied freely. The rib base can also have a greater wall thickness than the rib tip, whereby a favorable draft angle in terms of manufacturing technology results.

The projections (ribs) can be manufactured in one step in the injection-molding method together with a plastic cage made from the same plastic material.

However, a subsequent spraying-on of the rib structures is also possible, in a two-component injection-molding method, with a second plastic onto the cage interior surface of an already manufactured cage made of plastic or metal (e.g., of steel-plate or of brass).

The projections (rib structures) mentioned can also be subsequently mechanically connected to the cage base body, for example, by being snapped-in in the cage interior of a plastic- or metal-cage by snap-connection.

Using the disclosed design of a rolling-element bearing cage an increase of the bearing rotational speed is advantageously possible without any other changes to the bearing or the cage. It is furthermore advantageous that the disclosed bearing cage may contribute to a homogenization of bearing temperature.

The maintenance intervals can be extended, which correspondingly reduces the maintenance costs. Furthermore an increase of the bearing service life results.

It is furthermore advantageous that the grease loss during startup due to uneven grease distribution caused by the transport of the bearing can be reduced.

The risks with respect to a heat alarm during starting-up can be reduced.

Finally, in general a reduced amount of grease can be worked with.

BRIEF DESCRIPTION OF THE DRAWINGS

Exemplary embodiments of the invention are depicted in the drawings:

FIG. 2 shows a part of a cage, viewed radially outward, in a first embodiment of the invention, FIG. 3 shows a part of the cage, viewed radially outward, in a second embodiment of the invention,

FIG. 4a,

DETAILED DESCRIPTION

Figure 1:
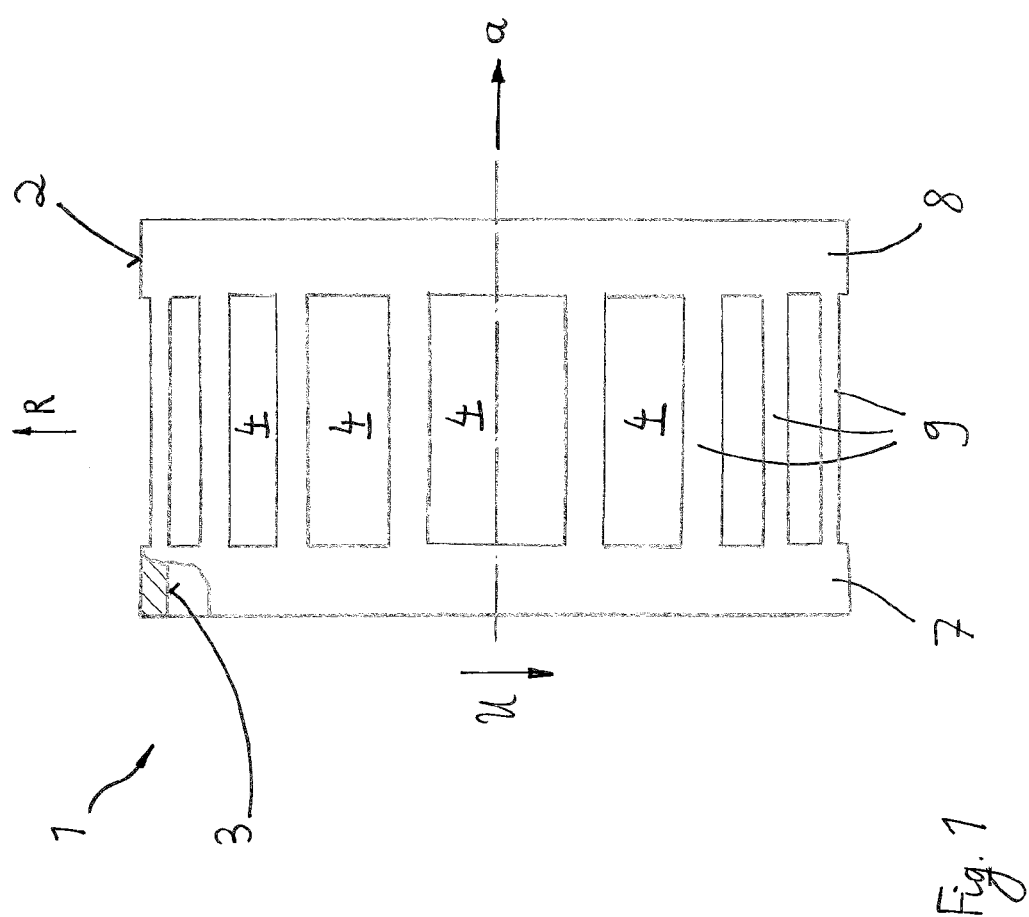
FIG. 1 shows the side view of a cage of a cylindrical roller bearing.

In FIG. 1 a rolling-element bearing cage can be seen in side view, which is used in a cylindrical roller bearing. The cage 1 includes two side rings 7 and 8, which are connected to each other via a number of bridges 9. The bridges 9 extend in axial direction a. Receiving pockets 4 for the rolling elements, thus in the present case for cylindrical rollers, are formed between the bridges 9 and the side rings 7, 8. The cage 1 is configured one-part as an injection-molded part.

The cage 1 accordingly has an annular structure, which is characterized by a radially outer-lying surface 2 and a radially inner-lying surface 3 (in FIG. 1 the radially inner-lying surface 3 can be recognized by the partial section depicted).

If a section of the cage 1 is considered from inside, i.e., in radial direction R, the sections are seen as they are depicted in FIGS. 2 and 3 for two alternative solutions.

As can be seen, projections 5 are formed-onto the radially inner-lying surface 3, which projections 5 extend into the space that is delimited by the inner-lying surface 3. Protruding into this space the projections 5 form a free surface 6. In comparison to a conventional cage, the free surface 6 represents a surface on which lubricating grease can adhere. The grease is thereby better retained in the region of the rolling elements and of the cage.

As is evident from FIG. 2, the projections 5 can extend as rib-shaped structures in axial direction a. Here the projections need not necessarily be configured continuous; interruptions are also possible.

In FIG. 3 a solution is sketched wherein the projections 5 extend in the circumferential direction U. Here interruptions are provided in the region of the side rings 7, 9, i.e., the extensions 5 each extend over only a small part of the circumference.

Various possibilities are considered for the formation or design of the projections 5. Various variants, which can absolutely also be used in combination, emerge from FIGS. 4a to 4d.

Figure 4D:
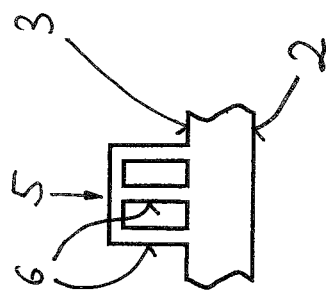
FIG. 4d show the sections A-A, B-B, C-C, and D-D according to FIG. 2 and FIG. 3 for different embodiments of projections that are disposed on the inner-lying surfaces of the cage.
Figure 4C:
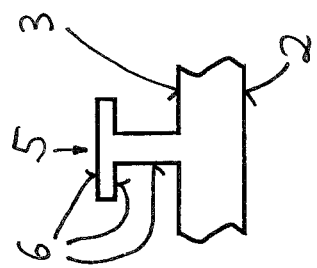
FIG. 4c.
Figure 4B:
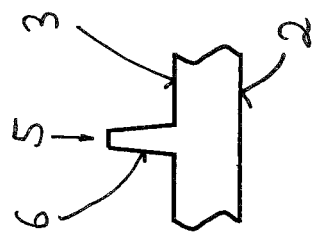
FIG. 4b.
Figure 4A:
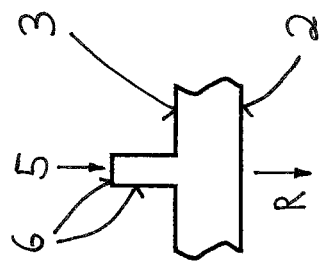

In the simplest case, in cross-section the projections 5 (for this purpose see the sections A-A, B-B, C-C, D-D according to FIGS. 2 and 3) have a rectangular contour, as FIG. 4a shows.

However, a conical formation can also be provided, which can be advantageous in particular from manufacturing-technology perspectives (easier demolding from the injection-molding tool). FIG. 4b shows such a solution.

In any case, the design sketched in FIG. 4c is indeed more demanding in terms of manufacturing technology if a one-part injection-molding solution is envisaged. However, an improved adhesion of lubricating grease is ensured here by the T-shaped design sketched. Alternatively L-shaped structures are also possible.

Designs of the projections as they arise from FIG. 4d are also conceivable. In general, a one-piece solution is indeed only scarcely possible in terms of manufacturing technology, however, chamber-type regions arise here that optimally hold the grease in the region wherein it is needed.

REFERENCE NUMBER LIST

1 Rolling-element bearing cage
2 Radially outer-lying surface
3 Radially inner-lying surface
4 Receiving pockets
5 Projection
6 Surface
7 Side ring
8 Side ring
9 Bridge
a Axial direction
U Circumferential direction
R Radial direction

The invention claimed is:

1. A rolling-element bearing cage, comprising an annular element including a radially outer-lying surface and a radially inner-lying surface, wherein receiving pockets for rolling elements are formed in the annular element, wherein at least one projection extending radially inward is formed on the radially inner-lying surface and extends into a space that is delimited by the inner-lying surface, and which projection forms an exposed surface in this space, wherein the at least one radially inwardly extending projection is disposed in an axial region outside an axial extension of the receiving pockets, wherein the rolling-element bearing cage is injection molded, and wherein the at least one projection is formed from a material different than a material of the radially inner-lying surface.

2. The rolling-element bearing cage according to claim 1, wherein the projection is rib-shaped.

3. A rolling-element bearing cage comprising:
a radially outer-lying surface;
a radially inner-lying surface;
a first radial wall and a second radial wall connecting the radially outer-lying surface and the radially inner-lying surface;
a plurality of receiving pockets configured to receive rolling elements, the receiving pockets being spaced from the first radial wall by a first annular band of the radially inner-lying surface and being spaced from the second radial wall by a second annular band of the radially inner-lying surface; and
at least one projection extending radially inward from the radially inner-lying surface into a spaced defined by the radially inner-lying surface, at least part of the at least one projection being located in the first annular band,
wherein the rolling-element bearing cage is injection molded,
wherein the at least one projection comprises at least one rib having an axial length and a circumferential length and wherein the axial length is greater than the circumferential length, and
wherein the at least one rib extends from the first radial wall to a first one of the plurality of receiving pockets.

4. The rolling-element bearing cage according to claim 3, wherein the projection, viewed in the radial direction, forms an enclosed structure.

5. The rolling-element bearing according to claim 4, wherein the enclosed structure is polygonal or honeycomb shaped.

6. The rolling-element bearing cage according to claim 3, wherein the projection is rectangular in an axial section or in a radial section.

7. The rolling-element bearing cage according to claim 3, wherein the projection is conical in an axial section or in a radial section, and wherein the projection tapers with increasing distance from the inner-lying surface.

8. The rolling-element bearing cage according to claim 3, wherein the projection has a shape in an axial section or in a radial section that widens in its end region lying distant from the inner-lying surface.

9. The rolling-element bearing cage according to claim 3, wherein the annular element and the at least one projection are formed in one-piece.

10. The rolling-element bearing cage according to claim 3, wherein the projection is T-shaped or L-shaped.

11. The rolling-element bearing cage according to claim 3, wherein the at least one rib includes first and second sidewalls that converge toward one another.

12. The rolling-element bearing cage according to claim 3, wherein the at least one projection comprises a first, radial, projection portion and a second projection portion perpendicular to the first projection portion.

13. The rolling-element bearing cage according to claim 3, wherein the at least one projection is located entirely in the first annular band.

14. The rolling-element bearing cage according to claim 3, wherein the at least one projection is formed from a material different than a material of the radially inner-lying surface.

15. A rolling-element bearing cage comprising:
a radially outer-lying surface;
a radially inner-lying surface;
a first radial wall and a second radial wall connecting the radially outer-lying surface and the radially inner-lying surface;
a plurality of receiving pockets configured to receive rolling elements, the receiving pockets being spaced from the first radial wall by a first annular band of the radially inner-lying surface and being spaced from the second radial wall by a second annular band of the radially inner-lying surface; and
at least one projection extending radially inward from the radially inner-lying surface into a spaced defined by the radially inner-lying surface, at least part of the at least one projection being located in the first annular band,
wherein the rolling-element bearing cage is injection molded, and
wherein the at least one projection comprises at least one rib having an axial length and a circumferential length and wherein the circumferential length is greater than the axial length.

16. The rolling-element bearing cage according to claim 15, wherein the at least one rib has a sidewall coplanar with the first radial wall.

17. The rolling-element bearing cage according to claim 15, wherein the at least one rib extends from a first one of the plurality of receiving pockets to a second one of the plurality of receiving pockets.

18. The rolling-element bearing cage according to claim 15, wherein the at least one projection is formed from a material different than a material of the radially inner-lying surface.

19. The rolling-element bearing cage according to claim 15, wherein the at least one rib includes first and second sidewalls that converge toward one another.

20. The rolling-element bearing cage according to claim 15, wherein the at least one projection comprises a first, radial, projection portion and a second projection portion perpendicular to the first projection portion.

* * * * *